US008509809B2

(12) United States Patent
Hirsch

(10) Patent No.: US 8,509,809 B2
(45) Date of Patent: Aug. 13, 2013

(54) THIRD PARTY DEVICE LOCATION ESTIMATION IN WIRELESS COMMUNICATION NETWORKS

(75) Inventor: Olaf J. Hirsch, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/158,029

(22) Filed: Jun. 10, 2011

(65) Prior Publication Data
US 2012/0315919 A1 Dec. 13, 2012

(51) Int. Cl.
H04W 24/00 (2009.01)
H03C 1/62 (2006.01)
H04M 11/04 (2006.01)

(52) U.S. Cl.
USPC .............. 455/456.1; 455/115.1; 455/404.2

(58) Field of Classification Search
USPC .................................. 455/456.1–6
See application file for complete search history.

(56) References Cited

U.S. PATENT DOCUMENTS

| | | | |
|---|---|---|---|
| 6,034,635 A | 3/2000 | Gilhousen | |
| 6,166,685 A | 12/2000 | Soliman | |
| 6,420,999 B1 | 7/2002 | Vayanos | |
| 6,618,005 B2 * | 9/2003 | Hannah et al. | 342/465 |
| 6,744,398 B1 | 6/2004 | Pyner et al. | |
| 7,289,813 B2 | 10/2007 | Karaoguz | |
| 2001/0053699 A1 | 12/2001 | McCrady et al. | |
| 2002/0155845 A1* | 10/2002 | Martorana | 455/456 |
| 2002/0196184 A1* | 12/2002 | Johnson et al. | 342/387 |
| 2003/0134647 A1 | 7/2003 | Santhoff et al. | |
| 2004/0008138 A1 | 1/2004 | Hockley et al. | |
| 2004/0147269 A1* | 7/2004 | Kim | 455/456.2 |
| 2004/0258012 A1 | 12/2004 | Ishii | |
| 2004/0264407 A1 | 12/2004 | Tang et al. | |
| 2005/0135257 A1 | 6/2005 | Stephens et al. | |
| 2007/0121560 A1* | 5/2007 | Edge | 370/338 |

(Continued)

FOREIGN PATENT DOCUMENTS

| | | |
|---|---|---|
| WO | 2012170046 A1 | 12/2012 |
| WO | 2012170062 | 12/2012 |

(Continued)

OTHER PUBLICATIONS

International Search Report and Written Opinion—PCT/US2011/054977—ISA/EPO—Jan. 31, 2012, 7 pages.

(Continued)

*Primary Examiner* — Jinsong Hu
*Assistant Examiner* — William Nealon
(74) *Attorney, Agent, or Firm* — DeLizio Gilliam, PLLC

(57) ABSTRACT

A third party device location estimation mechanism can be implemented in a wireless communication network. In one embodiment, a distance between an observing communication device and a reference communication device and a distance between the observing communication device and a target communication device are determined. An exchange of messages between the target communication device and the reference communication device is detected at the observing communication device. Timing information associated with the exchanged messages is determined at the observing communication device. A distance between the target communication device and the reference communication device is determined at the observing communication device based, at least in part, on the distance between the observing communication device and the reference communication device, the distance between the observing communication device and the target communication device, and the timing information associated with the messages exchanged between the target communication device and the reference communication device.

26 Claims, 9 Drawing Sheets

(56) References Cited

U.S. PATENT DOCUMENTS

| | | |
|---|---|---|
| 2007/0296633 A1 | 12/2007 | Yanagihara |
| 2008/0103696 A1 | 5/2008 | Cheok et al. |
| 2008/0125161 A1 | 5/2008 | Ergen et al. |
| 2008/0130604 A1 | 6/2008 | Boyd |
| 2008/0188236 A1 | 8/2008 | Alles et al. |
| 2008/0248741 A1* | 10/2008 | Alizadeh-Shabdiz ....... 455/3.02 |
| 2008/0287139 A1 | 11/2008 | Carlson et al. |
| 2009/0280825 A1 | 11/2009 | Malik et al. |
| 2010/0130225 A1 | 5/2010 | Alles et al. |
| 2010/0135178 A1 | 6/2010 | Aggarwal et al. |
| 2010/0150117 A1 | 6/2010 | Aweya et al. |
| 2011/0059752 A1 | 3/2011 | Garin et al. |
| 2011/0117925 A1 | 5/2011 | Sampath et al. |
| 2011/0136506 A1 | 6/2011 | Stewart |
| 2011/0188389 A1 | 8/2011 | Hedley et al. |
| 2011/0244881 A1 | 10/2011 | Bando et al. |
| 2012/0087272 A1 | 4/2012 | Lemkin et al. |
| 2012/0314587 A1 | 12/2012 | Curticapean |
| 2013/0005347 A1 | 1/2013 | Curticapean |
| 2013/0072217 A1 | 3/2013 | Zhang et al. |
| 2013/0072218 A1 | 3/2013 | Zhang et al. |
| 2013/0072219 A1 | 3/2013 | Zhang et al. |
| 2013/0072220 A1 | 3/2013 | Zhang et al. |
| 2013/0100850 A1 | 4/2013 | Zhang et al. |

FOREIGN PATENT DOCUMENTS

| | | |
|---|---|---|
| WO | 2013002812 A2 | 1/2013 |
| WO | 2013043664 | 3/2013 |
| WO | 2013043675 | 3/2013 |
| WO | 2013043681 | 3/2013 |
| WO | 2013043685 | 3/2013 |
| WO | 2013059636 | 4/2013 |

OTHER PUBLICATIONS

International Search Report and Written Opinion—PCT/US2011/043781—ISA/EPO—Nov. 17, 2011, 7 pages.
International Search Report and Written Opinion—PCT/US2011/046074—ISA/EPO—Dec. 16, 2011, 10 pages.
Co-pending U.S. Appl. No. 13/155,037, filed Jun. 7, 2011.
Co-pending U.S. Appl. No. 13/170,353, filed Jun. 28, 2011.
Co-pending U.S. Appl. No. 13/236,172, filed Sep. 19, 2011.
Co-pending U.S. Appl. No. 13/236,208, filed Sep. 19, 2011.
Co-pending U.S. Appl. No. 13/236,232, filed Sep. 19, 2011.
Co-pending U.S. Appl. No. 13/236,259, filed Sep. 19, 2011.
Co-pending U.S. Appl. No. 13/278,642, filed Oct. 21, 2011.
Co-pending U.S. Appl. No. 13/315,174, filed Dec. 8, 2011.
U.S. Appl. No. 13/236,172 Office Action, Jun. 7, 2012, 25 pages.
U.S. Appl. No. 13/236,232 Office Action, Oct. 11, 2012, 13 Pages.
U.S. Appl. No. 13/236,208 Office Action, Nov. 7, 2012, 14 pages.
Foy, W.H., "Position-Location Solutions by Taylor-Series Estimation", IEEE Transactions on Aerospace and Electronic Systems, IEEE Service Center, Piscataway, NJ, US, vol. AES-10, No. 2, Mar. 1, 1976, pp. 187-194, XP011166129, ISSN: 0018-9251.
Kleine-Ostmann, T., et al., "A data fusion architecture for enhanced position estimation in wireless networks", IEEE Communications Letters, IEEE Service Center, Piscataway, NJ, US, vol. 5, No. 8, Aug. 1, 2001, pp. 343-345, XP011423565, ISSN: 1089-7798, DOI: 10.1109/4234.940986 Sections II and III.
Li, H., et al., "Combination of Taylor and Chan method in mobile positioning", Cybernetic Intelligent Systems (CIS), 2011 IEEE 10th International Conference on, IEEE, Sep. 1, 2011, pp. 104-110, XP932136955, DOI : 10.1109/ CIS.2011.6169143 ISBN: 978-1-4673-0687-4 Abstract Sections I-III.
Shen, G., et al., "Performance comparison of TOA and TDOA based location estimation algorithms in LOS environment", (WPNC '08) 5th, IEEE, Mar. 27, 2008, pp. 71-78, XP031247832, ISBN: 978-1-4244-1798-8 Section II (TOA Based Location Estimation Algorithms}: "C. Taylor Series Method".
Gholami, Mohammad R. et al., "Positioning algorithms for cooperative networks in the presence of an unknown turn-around time", 2011 IEEE 12th Workshop on Signal Processing Advancesin Wireless Communications (SPAWC 2011) IEEE Piscataway,NJ, USA, IEEE, Piscataway, NJ, USA, XP032035718, 001: 10.11 09/SPAWC.2011. 5990386; ISBN: 978-1-4244-9333-3 Jun. 26, 2011 , 166-170.
Yu, K et al., "TOA-based distributed localisation with unknown internal delays and clock frequency offsets in wireless sensor networks", IET Signal Processing vol. 3, No. 2 XP006032603, ISSN: 1751-9683, 001: 10.1049I1ET-SPR:20080029 Mar. 2, 2009 , 106-118.
"PCT Application No. PCT/US12/56017 International Search Report", Jan. 3, 2013 , 14 pages.
"PCT Application No. PCT/US12/56053 International Search Report", Jan. 3, 2013 , 13 pages.
"PCT Application No. PCT/US2012/056036 International Search Report", Jan. 3, 2013 , 13 pages.
"PCT Application No. PCT/US2012/068543 International Search Report", Feb. 15, 2013 , 15 pages.
"PCT/US2012/056046 International Search Report", Jan. 3, 2013 , 13 pages.
U.S. Appl. No. 13/236,172 Office Action, 25 pages.
"U.S. Appl. No. 13/236,172 Office Action", Jan. 3, 2013 , 25 pages.
"PCT Application No. PCT/US2012/061081 International Search Report", Mar. 27, 2013 , 11 pages.
"U.S. Appl. No. 13/155,037 Office Action", Apr. 3, 2013 , 20 pages.
"PCT Application No. PCT/US2011/043781 International Preliminary Report on Patentability", Jun. 7, 2013, 4 pages.
"PCT Application No. PCT/US2011/054977 International Preliminary Report on Patentability", Jun. 10, 2013, 8 pages.

* cited by examiner

STAGE 1

STAGE 2

STAGE 3

STAGE 4

THIRD PARTY DEVICE LOCATION ESTIMATION IN WIRELESS COMMUNICATION NETWORKS

BACKGROUND

Embodiments of the inventive subject matter generally relate to the field of wireless communications systems, and, more particularly, to a third party device location estimation mechanism for wireless communication networks.

In wireless communication networks, the distance between a wireless area network (WLAN) client station and a WLAN access point (or other types of WLAN devices) can be estimated by measuring the round-trip time (RTT) between a message sent from the client station to the access point and an acknowledgement message (or other reply message) sent from the access point to the client station. In some cases, the location of the client station can be estimated using time different of arrival (TDOA) techniques that analyze communications of three or more network devices (e.g., access points) with known locations.

SUMMARY

Various embodiments for third party device location estimation in wireless communication networks are disclosed. In one embodiment, a distance between an observing communication device and a reference communication device of a wireless communication network is determined. A distance between the observing communication device and a target communication device of the wireless communication network is also determined. An exchange of messages between the target communication device and the reference communication device is detected at the observing communication device. Timing information associated with the messages exchanged between the target communication device and the reference communication device is determined at the observing communication device. A distance between the target communication device and the reference communication device is determined at the observing communication device based, at least in part, on the distance between the observing communication device and the reference communication device, the distance between the observing communication device and the target communication device, and the timing information associated with the messages exchanged between the target communication device and the reference communication device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to implementing a third party device location estimation mechanism in communication devices of an 802.11 WLAN, in other embodiments the third party device location estimation mechanism can be implemented by other communication devices that operate according to other suitable standards and protocols (e.g., Worldwide Interoperability for Microwave Access (WiMAX)). In other instances, well-known instruction instances, protocols, structures, and techniques have not been shown in detail in order not to obfuscate the description.

A client station in a wireless communication network can utilize RTT measurements to determine the distance between the client station and another communication device (e.g., an access point). The client station can also utilize TDOA techniques to determine its own actual location within the wireless communication network. However, to determine its own actual location using TDOA measurements, the client station typically needs to communication with three or more access points with known locations.

In some embodiments, an observing client station (or "observing communication device") can implement a third party location estimation technique to determine the distance from a target third party client station ("target client station" or "target communication device") to a reference communication device (e.g., an access point). The observing client station can then determine the relative location of the target client station with reference to the access point based on the measured distance (as will be described with reference to FIGS. 1-4). Furthermore, in some embodiments, the observing client station can utilize the third party location estimation technique to estimate the actual location of the target client station within the wireless communication network (as will be described with reference to FIGS. 5-8). It is noted that, although some examples of the third party location estimation technique described below indicate that the observing communication device and the target communication device are client stations and the reference communication device is an access point, in other implementations the observing communication device, the target communication device, and the reference communication device may be other types of communication devices (e.g., other types of WLAN devices) in the wireless communication network.

Figure 1:
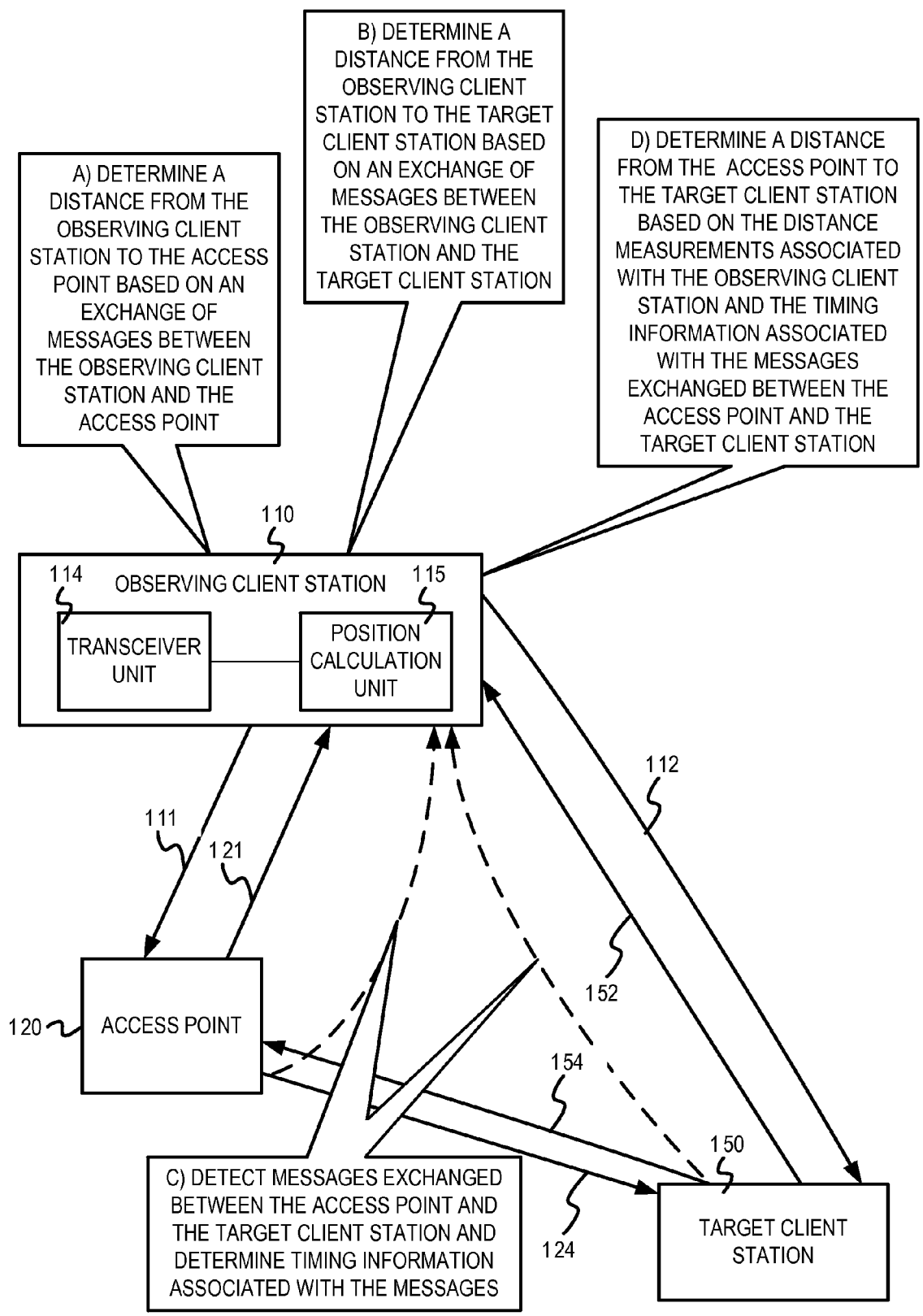
FIG. 1 is an example conceptual diagram illustrating a third party location estimation mechanism implemented in a client station of a wireless communication network.

FIG. 1 is an example conceptual diagram illustrating a third party device location estimation mechanism implemented in a client station of a wireless communication network. FIG. 1 depicts a communication network 100 (e.g., a WLAN) comprising an observing client device 110 (i.e., the observing communication device), an access point 120 (i.e., the reference communication device), and a target client device 150 (i.e., the target communication device). The observing client device 120 comprises a transceiver unit 114 and a position calculation unit 115. The client stations 110 and 150 may be notebook computers, tablet computers, mobile phones, gaming consoles, and/or other electronic devices with wireless communication capabilities.

At stage A, a distance from the observing client station 110 to the access point 120 can be determined based on an exchange of messages between the observing client station 110 and the access point 120. In one implementation, the observing client station 110 can first send a message 111 to the access point 120. For example, the transceiver unit 114 of the observing client station 110 can send a data or control packet to the access point 120. The position calculation unit 115 of the observing client station 110 can detect and store the time instant at which the end of the message 111 is sent to the access point 120. For example, based on a reference clock (or a timer), the position calculation unit 115 can store a timestamp indicating the time the end of the message 111 is sent to the access point 120. In one implementation, in response to receiving the message 111, the access point 120 can send an acknowledgement message 121 to the observing client station 110. The position calculation unit 115 can detect and store the time instant (e.g., a timestamp) at which the beginning of the acknowledgement message 121 is received at the observing client station 110. The position calculation unit 115 can then determine the time difference ($t_{DIFF}$) between the time the end of the message 111 is sent to the access point 120 and the time the beginning of the acknowledgement message 121 is received at the observing client station 110. After determining the time difference ($t_{DIFF}$), the position calculation unit 115 can determine the distance (D3) between the observing client station 110 and the access point 120 (based on the round-trip time of the messages) according to Eq. 1, where c is the speed of light and $t_{WAIT}$ is the SIFS (Short InterFrame Space) time interval associated with the message exchange between the two network devices.

$$\text{Distance} = [c*(t_{DIFF} - t_{WAIT})]/2 \qquad \text{Eq. 1}$$

In some embodiments, the SIFS time interval is the time interval that a receiving network device will wait to send the acknowledgement message 121 (or other response, such as a CTS message) to the transmitting network device. For WLAN networks, the SIFS time interval is defined by the 802.11 standard. For example, the SIFS time interval is typically 10 µs for 802.11b/g, and the SIFS time interval is typically 16 µs for 802.11a. It is noted, however, that in other implementations $t_{WAIT}$ may be other time intervals that network devices implement after receiving a message, such as the Reduced InterFrame Space (RIFS) time interval that is applied in some cases by 802.11n devices instead of the SIFS time interval.

At stage B, a distance from the observing client station 110 to the target client station 150 can be determined based on an exchange of messages between the two client stations. In one implementation, the observing client station 110 can first send a message 112 to the target client station 150. For example, the transceiver unit 115 can send a data or control packet to the target client station 150. The position calculation unit 115 can detect and store the time at which the end of the message 112 is sent to the target client station 150. For example, based on a reference clock (or a timer), the position calculation unit 115 can store a timestamp indicating the time the end of the message 112 is sent to the target client station 150. In one implementation, in response to receiving the message 112, the target client station 150 can send an acknowledgement message 152 to the observing client station 110. The position calculation unit 115 can detect and store the time (e.g., a timestamp) at which the beginning of the acknowledgement message 152 is received at the observing client station 110. The position calculation unit 115 can then determine the time difference ($t_{DIFF}$) between the time the end of the message 112 is sent to the target client station 150 and the time the acknowledgement message 152 is received at the observing client station 110. After determining the time difference ($t_{DIFF}$), the position calculation unit 115 can determine the distance (D2) between the observing client station 110 and the target client station 150 based on Eq. 1.

At stage C, messages exchanged between the access point 120 and the target client station 150 are detected and timing information associated with the messages is determined. In one embodiment, the position calculation unit 115 can detect messages exchanged between the access point 120 and the target client station 150, and detect the time at which the messages are received at the observing client station 110. For example, position calculation unit 115 can detect a message 154 (e.g., a data or control packet) that is broadcast from the target client station 150 to the access point 120. The position calculation unit 115 can determine the time instant ($T_{STA\_1}$) at which the message 154 broadcast from the target client station 150 (and intended for the access point 120) is received at the observing client station 110. For example, the position calculation unit 115 can determine the time at which the end of the message 154 is received at the observing client station 110. Also, the position calculation unit 115 can detect an acknowledgement message 124 that is broadcast from the access point 120 to the target client station 150 (e.g., in response to the access point 120 receiving the message 154 from the target client station 150). The position calculation unit 115 can determine the time instant ($T_{STA\_2}$) at which the acknowledgement message 124 broadcast from the access point 120 (and intended for the target client station 150) is received at the observing client station 110. For example, the position calculation unit 115 can determine the time at which the beginning of the acknowledgement message 124 is received at the observing client station 110. In some implementation, the position calculation unit 115 can identify the messages between the access point 120 and the target client station 150 by detecting identifier information (e.g., device ID, association ID, and/or address, etc.) associated with the devices within the broadcasted messages.

At stage D, a distance from the access point 120 to the target client station 150 is determined based, at least in part, on the distance measurements associated with the observing client station 110 and the timing information associated with the messages exchanged between the access point 120 and the target client station 150. In some embodiments, the position calculation unit 115 determines the distance (D1) from the access point 120 to the target client station 150 based, at least in part, on the distance (D3) between the observing client station 110 and the access point 120, the distance (D2) between the observing client station 110 and the target client station 150, and the timing information ($T_{STA\_1}$ and $T_{STA\_2}$) associated with the messages detected between the access point 120 and the target client station 150. For example, the time ($T_{AP}$) at which the end of the message 154 is received at the access point 120 from the target client station 150 can be represented as shown in Eq. 2, where $T_O$ is the time at which the end of the message 154 leaves the target client station 150 and $t_{D1}$ is the time it takes the message 154 to travel to the access point 120. $t_{D1}$ can be derived from D1 (the unknown distance between the access point 120 and the target client station 150) by dividing D1 with the speed of light (c).

$$T_{AP} = T_O + t_{D1} = T_O + (D1/c) \qquad \text{Eq. 2}$$

Additionally, the time ($T_{STA\_1}$) at which the message 154 broadcast from the target client station 150 (and intended for the access point 120) is received at the observing client station 110 (determined above in stage C) can be represented as shown in Eq. 3, where $T_O$ is the time at which the end of the message 154 leaves the target client station 150 and $t_{D2}$ is the time it takes the message 154 broadcasted from the target client station 150 to the access point 120 to travel to the observing client station 110. $t_{D2}$ can be derived from D2 (distance between the observing client station 110 and the target client station 150 determined above in stage B) by dividing D2 with the speed of light (c).

$$T_{STA\_1} = T_O + t_{D2} = T_O + (D2/c) \qquad \text{Eq. 3}$$

Furthermore, the time ($T_{STA\_2}$) at which the acknowledgement message 124 broadcast from the access point 120 (and intended for the target client station 150) is received at the observing client station 110 (determined above in stage C) can be represented as shown in Eq. 4a, where $T_{AP}$ is the time at which the end of the message 124 is received at the access point 120 from the target client station 150 (see Eq. 2), $t_{WAIT}$ is the SIFS (Short InterFrame Space) time interval associated with the message exchange between the two network devices, and $t_{D3}$ is the time it takes the acknowledge message 124 broadcasted from the access point 120 to the target client station 150 to travel to the observing client station 110. $t_{D3}$ can be derived from D3 (distance between the observing client station 110 and the access point 120 determined above in stage A) by dividing D3 with the speed of light (c). As shown in Eq. 4a, $T_O + (D1/c)$ can be substituted for $T_{AP}$ (according to Eq. 2). Also, as shown in Eq. 4b, $T_{STA\_1} - (D2/c)$ can be substituted for $T_O$ (according to Eq. 3). Then, the equation can be solved for D1 (the unknown distance between the access point 120 and the target client station 150), as shown in Eq. 4c and Eq. 4d.

$$T_{STA\_2} = T_{AP} + t_{WAIT} + t_{D3} = (T_O + (D1/c)) + t_{WAIT} + (D3/c) \qquad \text{Eq. 4a}$$

$$T_{STA\_2} = (T_{STA\_1} - (D2/c)) + (D1/c) + t_{WAIT} + (D3/c) \qquad \text{Eq. 4b}$$

$$(D1/c) = T_{STA\_2} - T_{STA\_1} + (D2/c) - t_{WAIT} - (D3/c) \qquad \text{Eq. 4c}$$

$$D1 = c^*(T_{STA\_2} - T_{STA\_1} + (D2/c) - t_{WAIT} - (D3/c)) \qquad \text{Eq. 4d}$$

The position calculation unit 115 can therefore determine the distance (D1) between the access point 120 and the target client station 150, according to Eq. 4d, based on the distance D2, the distance D3, the timing information $T_{STA\_1}$ and $T_{STA\_2}$, the time interval $t_{WAIT}$, and the speed of light (c). As described above, it is noted that in other implementations, instead of using the SIFS time interval, $t_{WAIT}$ may be other time intervals that network devices implement after receiving a message, such as the Reduced InterFrame Space (RIFS) time interval that is applied in some cases by 802.11n devices instead of the SIFS time interval. As will be further described below with reference to FIGS. 3-8, the distances D1, D2, and D3 (and additional distances if a second access point is utilized) can also be used to estimate the actual location of the target client station 150 (and, in some cases, the actual location of the observing client station 110).

Figure 2:
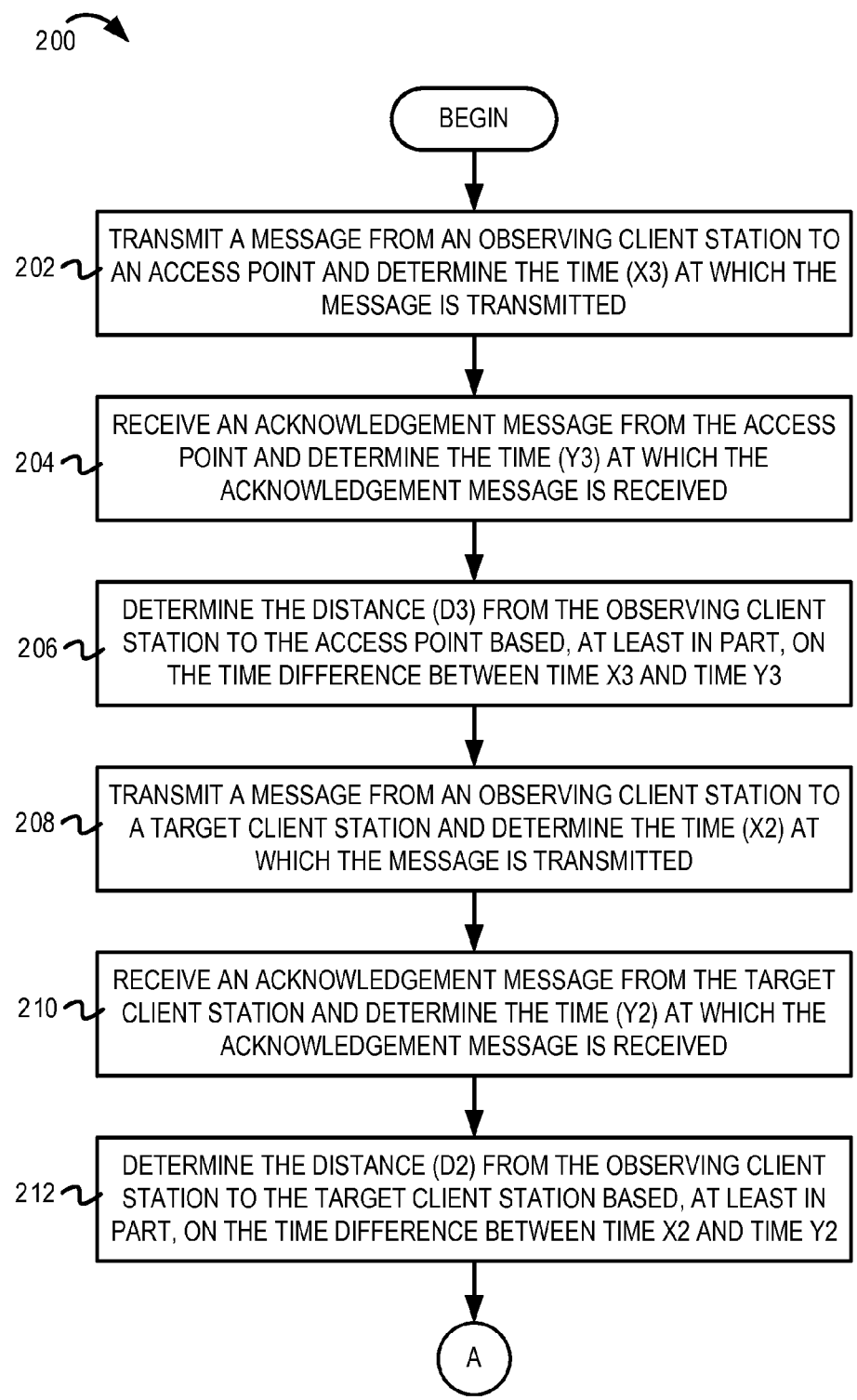
FIG. 2 depicts a flow diagram illustrating example operations for implementing a third party device location estimation mechanism in a wireless communication network.
Figure 3:
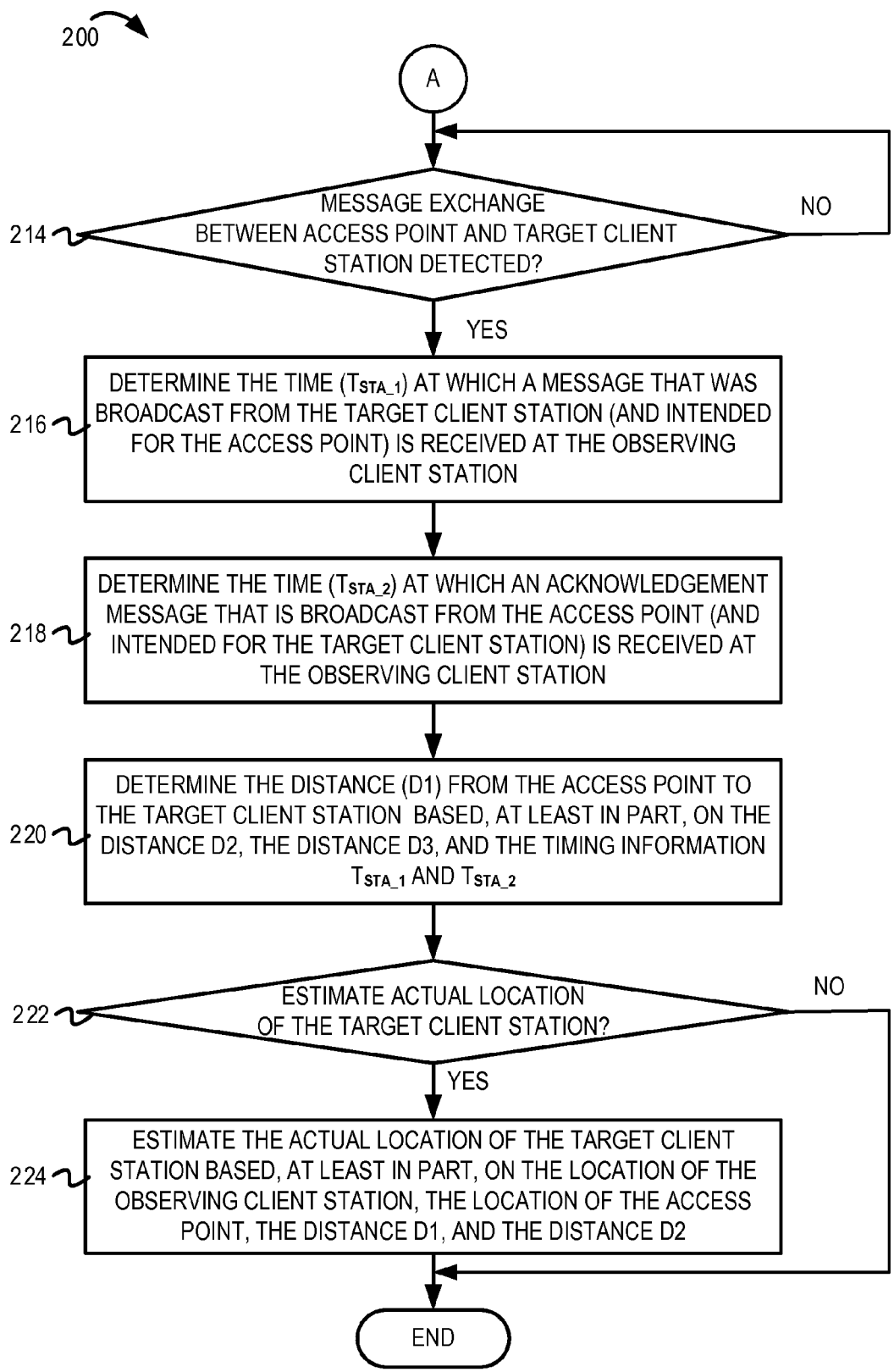
FIG. 3 depicts a flow diagram illustrating additional example operations for implementing the third party device location estimation mechanism in the wireless communication network.

FIG. 2 and FIG. 3 depict a flow diagram ("flow") 200 illustrating example operations for implementing a third party device location estimation mechanism in a wireless communication network. The flow 200 begins at block 202.

At block 202, a message is transmitted from the observing client station 110 to the access point 120 and a time (X3) at which the message is transmitted is determined. For example, the transceiver unit 114 transmits the message (e.g., message 111 shown in FIG. 1) to the access point 120 and the position calculation unit 115 determines a time (X3) at which the end of the message is transmitted. After block 202, the flow continues at block 204.

At block 204, an acknowledgement message is received at the observing client station 110 from the access point 120 and a time (Y3) at which the message is received is determined. For example, the transceiver unit 114 receives the acknowledgement message (e.g., message 121 shown in FIG. 1) from the access point 120 and the position calculation unit 115 determines a time (Y3) at which the beginning of the acknowledgment message is received. After block 204, the flow continues at block 206.

At block 206, the distance (D3) from the observing client station 110 to the access point 120 is determined based, at least in part, on the time difference between the times X3 and Y3. For example, the position calculation unit 115 determines the time difference between the times X3 and Y3, and then calculates D3 according to Eq. 1 shown above. In another example, if the locations of the access point 120 and the observing client station 110 are known or can be estimated (e.g., the access point 120 and/or the observing client station 110 have self-locating capabilities), D3 can be determined based on the location of the access point 120 and the location of the observing client station 110. In the example diagram shown in FIG. 4, the location of the access point 120 (i.e., A1) and the location of the observing client station 110 (i.e., S1) within the wireless communication network 400 are known and shown in the diagram. The circle 472 with a radius D3 represents the possible locations of the observing client station 110 if the distance D3 from the access point 120 (and therefore the relative location) is known, but the actual location of the observing client station is unknown. In some examples, if the location of the access point 120 is known (e.g., the access point 120 has self-locating capabilities), the observing client station 110 can send a location request message to the access point 120 and subsequently receive a location reply message indicating the location of the access point 120. After block 206, the flow continues at block 208.

At block 208, a message is transmitted from the observing client station 110 to the target client station and a time (X2) at which the message is transmitted is determined. For example, the transceiver unit 114 transmits the message (e.g., message 112 shown in FIG. 1) to the target client station 150 and the position calculation unit 115 determines a time (X2) at which the end of the message is transmitted. After block 208, the flow continues at block 210.

At block 210, an acknowledgement message is received at the observing client station 110 from the target client station 150 and a time (Y2) at which the message is received is determined. For example, the transceiver unit 114 receives the acknowledgement message (e.g., message 152 shown in FIG. 1) from the target clients station 150 and the position calculation unit 115 determines a time (Y2) at which the beginning of the acknowledgment message is received. After block 210, the flow continues at block 212.

At block 212, the distance (D2) from the observing client station 110 to the target client station 150 is determined based, at least in part, on the time difference between the times X2 and Y2. For example, the position calculation unit 115 determines the time difference between the times X2 and Y2, and then calculates D2 according to Eq. 1 shown above. The circle 475 shown in FIG. 4 has a radius of D2 and therefore illustrates the possible locations of the target client station 150 around the observing client station 110 (based on the estimated distance D2). As will be described further below, if the distance D1 from the access point 120 to the target client station 150 is determined, the location of the target client station 150 can be reduced to two possible locations around the circle 475 (e.g., locations S2' or S2 at the intersection points of the circle 475 and the circle 477). After block 212, the flow continues at block 214 in FIG. 3.

At block 214, it is determined whether a message exchange between the access point 120 and the target client station 150 is detected. For example, the position calculation unit 115 can detect whether a message (e.g., message 154 shown in FIG. 1) that was broadcast from the target client station 150 (and intended for the access point 120) is received at the observing client station 110. If such message is detected, the position calculation unit 115 can then detect an acknowledgement message (e.g., message 124 shown in FIG. 1) that is broadcast from the access point 120 (and intended for the target client station 150) and received at the observing client station 110. If it is determined that a message exchange between the access point 120 and the target client station is detected, the flow continues at block 216. Otherwise, the flow loops back to block 214 to continue monitoring messages received at the observing client station 110 to detect a message exchange between the access point 120 and the target client station 150.

At block 216, the time ($T_{STA\_1}$) at which a message that was broadcast from the target client station 150 (and intended for the access point 120) is received at the observing client station 110 is determined (e.g., the time at which the end of the message is received). The position calculation unit 115 can determine the time instant ($T_{STA\_1}$) in response to detecting the message that was broadcast from the target client station 150. After block 216, the flow continues at block 218.

At block 218, the time ($T_{STA\_2}$) at which an acknowledgement message that was broadcast from the access point 120 (and intended for the target client station 150) is received at the observing client station 110 is determined (e.g., the time at which the beginning of the acknowledgement message is received). The position calculation unit 115 can determine the time instant ($T_{STA\_2}$) in response to detecting the acknowledgement message that was broadcast from the access point 120. After block 218, the flow continues at block 220.

At block 220, a distance (D1) from the access point 120 to the target client station 150 is determined based, at least in part, on the distance D3 between the observing client station 110 and the access point 120, the distance D2 between the observing client station 110 and the target client station 150, and the timing information ($T_{STA\_1}$ and $T_{STA\_2}$) associated with the detected messages that were exchanged between the access point 120 and the target client station 150. For example, the position calculation unit 115 can determine the distance D1 based on the distance D3, the distance D2, the time $T_{STA\_1}$, the time $T_{STA\_2}$, the time interval $t_{WAIT}$, and the speed of light (c), according to the Eq. 2, Eq. 3, and Eq. 4a-Eq. 4d (as was described above with reference to FIG. 1). After block 220, the flow continues at block 222.

At block 222, it is determined whether to estimate the actual location of the target client station 150. In some cases, both the distance from the access point 120 to the target client station 150 (i.e., the relative location of the target client station 150 with respect to the access point 120), and the actual location of the target client station 150 can be determined. For example, the observing client station 110 may determine how far the target client station 110 is from the access point 120, and also estimate the location of the target client station 110 (e.g., latitude and longitude coordinates). As described above, in some cases, the observing client station 110 may include self-locating capabilities to determine its own location. The access point 120 may also include self-locating capabilities to determine its own location. The observing client station 110 can then communicate with the access point 120 (e.g., send a location request message) to determine the location of the access point 120 in order to perform location estimation operations with respect to the target client station 150, as will be further described below. If it is determined to estimate the actual location of the target client station 150, the flow continues at block 224. Otherwise, the flow ends.

Figure 4:
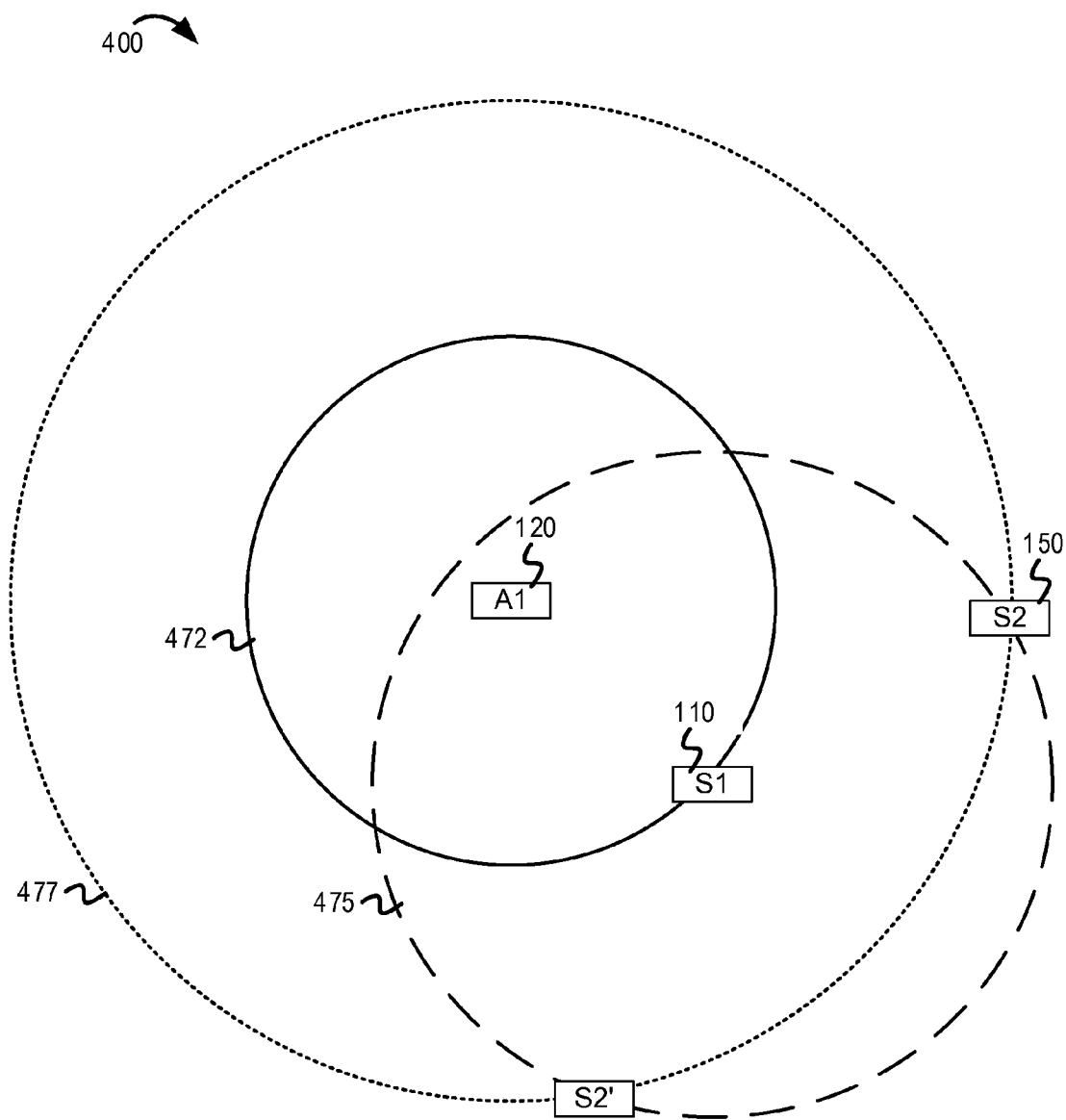
FIG. 4 is an example conceptual diagram illustrating a third party device location estimation technique in the wireless communication network.

At block 224, the actual location of the target client station 150 is estimated based, at least in part, on the location of the observing client station 110, the location of the access point 120, the distance D1, and the distance D2. As shown in FIG. 4, in response to determining the distance D1, the circle 477 with radius D1 can be determined, which illustrates the possible locations of the target client station 150 with respect to the access point 120. Furthermore, since the possible locations of the target client station 150 with respect to the observing client station 110 was also determined (see circle 475), the position calculation unit 115 can determine the intersection points of the circle 475 and the circle 477. The two intersecting points of the circles 475 and 477 represent the two possible locations S2 and S2' of the target client station 150 (assuming the location of the observing client station 110 (i.e., S1) is known). Therefore, determining the distance D1 can help to reduce the ambiguity with respect to the location of the target client station 150. In some implementations, the position calculation unit 115 can determine whether one of the two possible locations S2 and S2' can be ignored (and therefore the location of the target client station 150 can be determined) based on information stored within the position calculation unit 155 that constraints the location possibilities of the target client station 150 (e.g., based on the environment associated with the wireless communication network and/or based on a range of the access point). For example, if the access point 120 and the observing client station 110 are in a shopping mall, the position calculation unit 115 can ignore one of the two possible locations S2 or S2' of the target client station 150 if the location is outside the shopping mall. For example, the position calculation unit 115 can superimpose a map of the shopping mall on the diagram shown in FIG. 4 and determine that one of the two possible locations S2 and S2' of the target client station 150 is outside the shopping mall. In another implementation, the position calculation unit 115 can listen to communications between the target client station 150 and a second access point, in order to eliminate one of the two possible locations S2 or S2' and therefore determine the actual location of the target client station 150, as will be further described below with reference to FIG. 5. After block 224, the flow ends.

Figure 5:
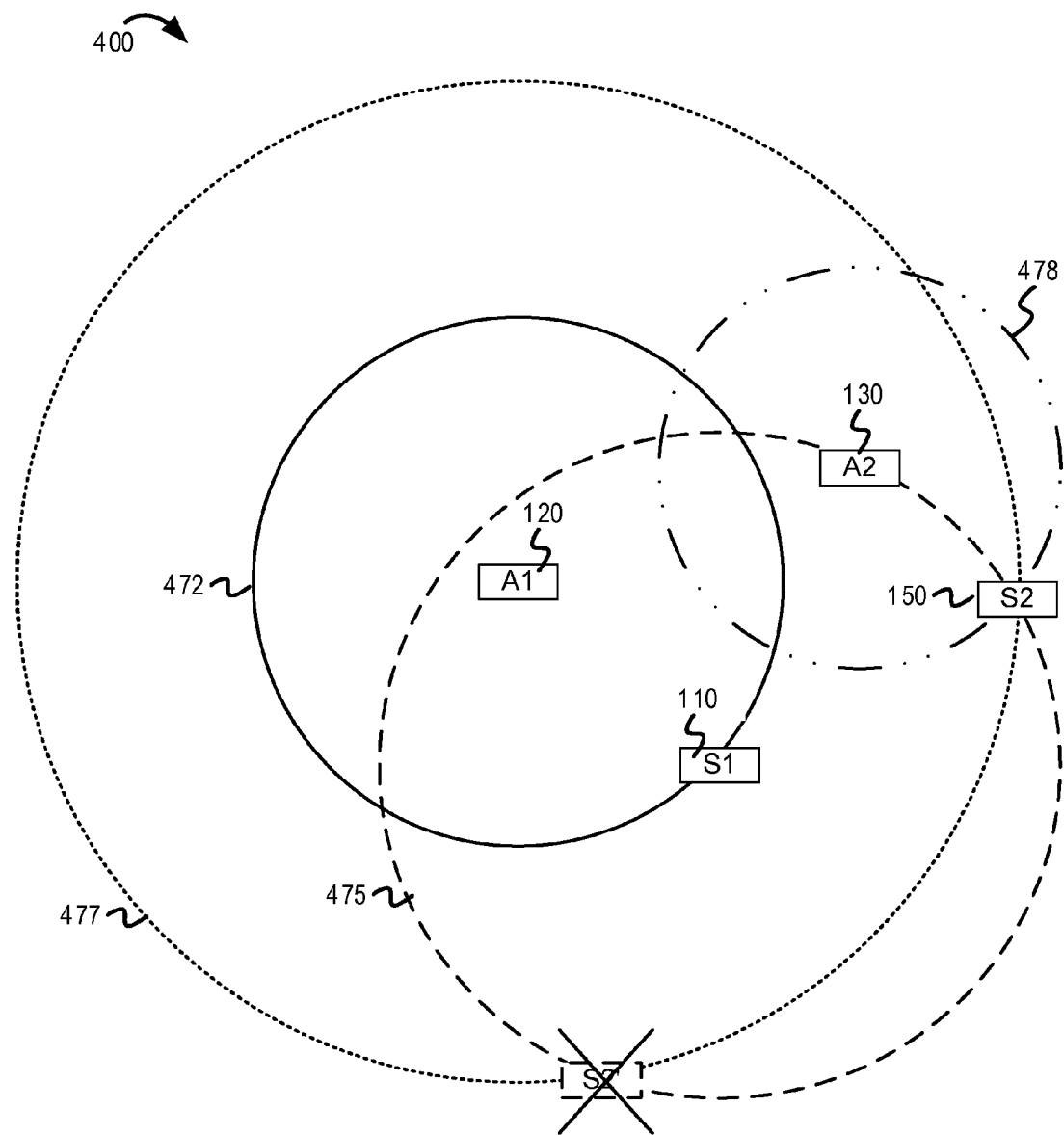
FIG. 5 is an example conceptual diagram illustrating another third party device location estimation technique in the wireless communication network.

In some implementations, as shown in the example of FIG. 5, the position calculation unit 115 of the observing client station 110 can detect at least one message exchange between the target client station 150 and a second access point 130 (similarly as was described above for the message exchange that is detected between the access point 120 and the target client station 150). For example, the target client station 150 can transmit a message (e.g., data packet) to the second access point 130, and the second access point 130 can respond by sending an acknowledgement message to the target client station 150. The position calculation unit 115 can detect the message sent from the target client station 150 and the acknowledgement message sent from the second access point 130. Then, the position calculation unit 115 can perform the operations and calculations described above with reference to FIG. 1 and FIG. 2 to determine the distance (D4) from the second access point 130 to the target client station 150. For example, the position calculation unit 115 can determine the distance from the observing client station 110 to the second access point 130 (similar to stage A of FIG. 1), and can determine the time at which the observing client station 110 received the messages (similar to stage C of FIG. 1). The position calculation unit 115 already determined the distance D2 between the observing client station 110 and the target client station 150 (at stage B of FIG. 1). The position calculation unit 115 can then determine the distance D4 (between the second access point 130 and the target client station 150) using the same equations shown above with reference to FIG. 1 (i.e., Eq. 2-Eq. 4d). The circle 478 shown in FIG. 5 with radius D4 illustrates the possible locations of the target client station 150 around the second access point 130. In one implementation, the position calculation unit 115 can determine the intersection point of the circle 475, 477, and 478 to determine the actual location of the target client station in the wireless communication network 400. As shown in FIG. 5, based on the additional data points associated with the circle 478 and the distance D4, the position calculation unit 115 can eliminate the possible location S2' indicated by the diagram in FIG. 4, and determine that the possible location S2 is the actual location of the target client station 150 (since the location S2 is the intersection point of the circles 475, 477, and 478).

Figure 6:
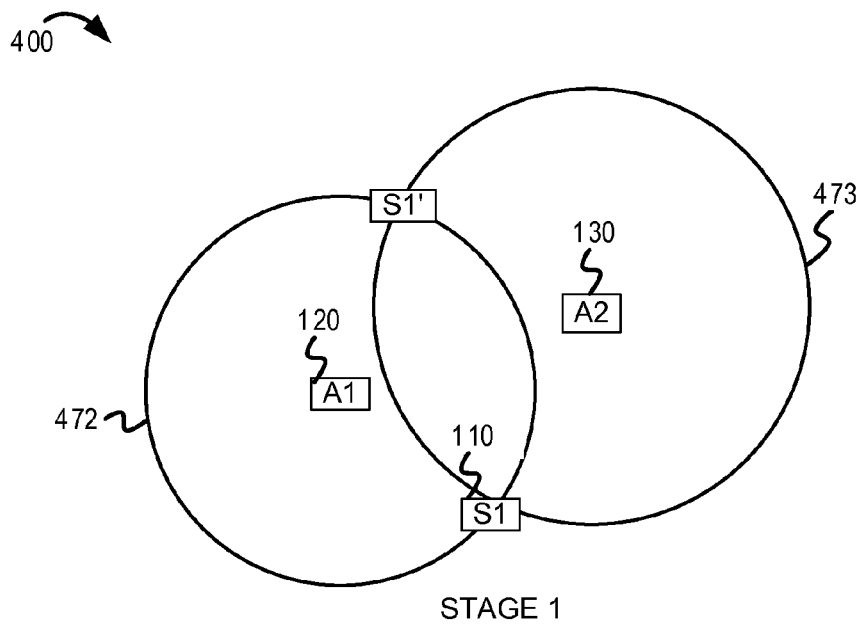
FIGS. 6, 7, and 8 are example conceptual diagrams illustrating another network device location estimation technique in the wireless communication network.
Figure 6:
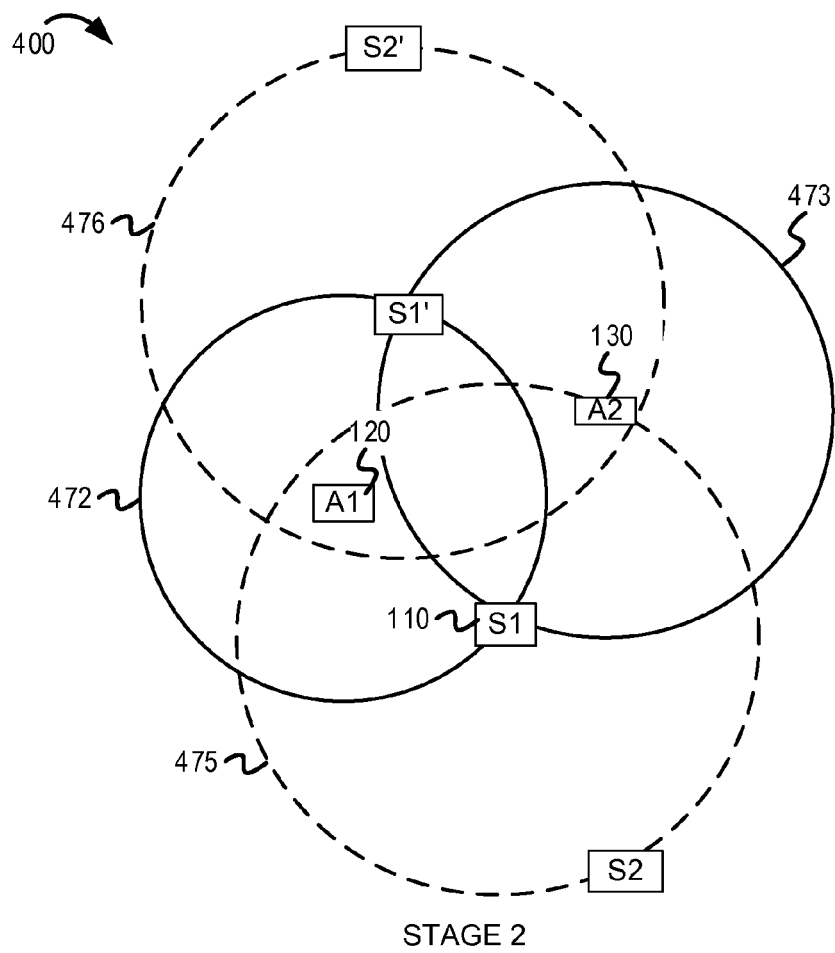

In some implementations, if the location of the observing client station 110 is unknown, the position calculation unit 115 can estimate the location of the observing client station 110 as shown in the example of FIG. 6, if the location of the access point 120 (i.e., location A1) and the second access point 130 (i.e., location A2) are known. For example, the position calculation unit 115 can determine the distance (D3) from the observing client station 110 to the access point 120, and the distance (D5) from the observing client station 110 to the second access point 130 (similarly as described above with reference to stage A of FIG. 1). As shown in Stage 1 of FIG. 6, the two intersection points of the circle 472 (with radius D3 around access point 120) and the circle 473 (with radius D5 around the second access point 130) indicate the two possible locations S1 and S1' of the observing client station 110 in the wireless communication network 400. The position calculation unit 115 can then determine the distance D2 from the observing client station 110 to the target client station 150 (similarly as described above with reference to stage B of FIG. 1). As shown in Stage 2 of FIG. 6, the circle 475 with radius D2 around the possible location Si of the observing client station 110 indicates one possible set of locations of the target client station 150, and the circle 476 with radius D2 around the other possible location S1' of the observing client station 110 indicates a second possible set of locations of the target client station 150. Additional operations and calculations can be performed in order to reduce the ambiguity with respect to the location of the target client station 150, as will be further described below with reference to Stages 3 and 4 in FIGS. 7 and 8.

In some implementations, the position calculation unit 115 can determine the distance (D1) between the access point 120 and the target client station 150, as was described above with reference to stages C and D of FIG. 1. As shown in Stage 3 of FIG. 7, after determining the distance D1 between the access point 120 and the target client station 150, the circle 477 can be used to narrow the number of possible locations of the target client station 150 to four possible locations S2, S2', S2", and S2'". These four possible locations correspond to the two intersection points of circles 475 and 477, and the two intersection points of circles 476 and 477. After Stage 3 shown in FIG. 7, the position calculation unit 115 has determined that the location of the observing client station 110 (i.e., its own location) is either at location S1 or S1', and the location of the target client station 150 is one of four possible locations S2, S2', S2", and S2'".

In some implementations, the position calculation unit 115 can also determine the distance (D4) between the second access point 130 and the target client station 150, as was described above with reference to FIG. 5. As shown in Stage 4 of FIG. 8, after determining the distance D4 between the second access point 130 and the target client station 150, the circle 478 can be used to narrow the number of possible locations of the target client station 150 to two possible locations S2 and S2' (by eliminating the other possible locations S2" and S2'" shown in FIG. 7 from consideration). The two possible locations S2 and S2' correspond to the intersection point of the circles 475, 477 and 478, and the intersection point of the circles 476, 477 and 478. After Stage 4 shown in FIG. 8, the position calculation unit 115 has determined that the location of the observing client station 110 (i.e., its own location) is either at location S1 or S1', and the location of the target client station 150 is either at location S2 or S2'.

Figure 7:
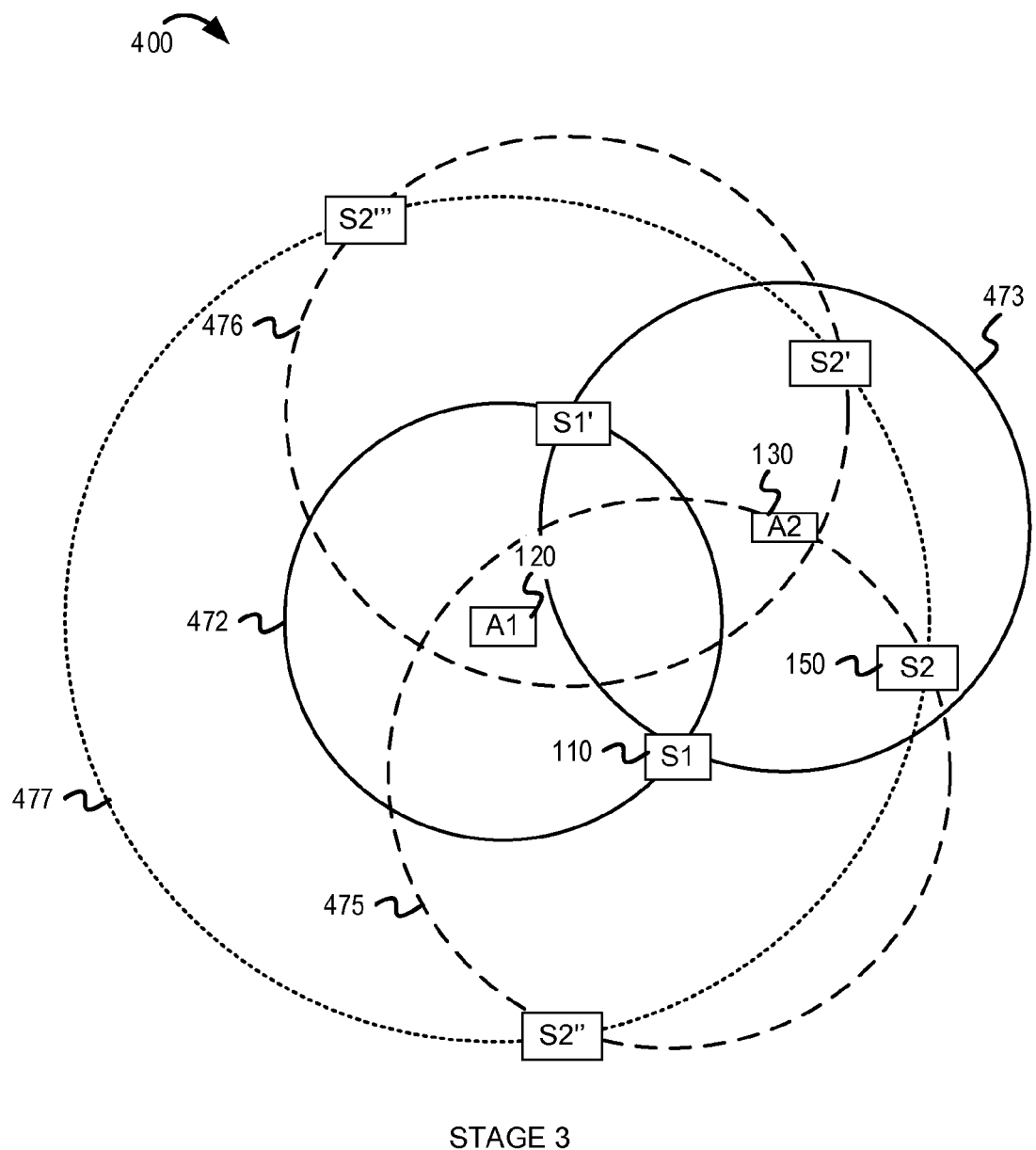
Figure 8:
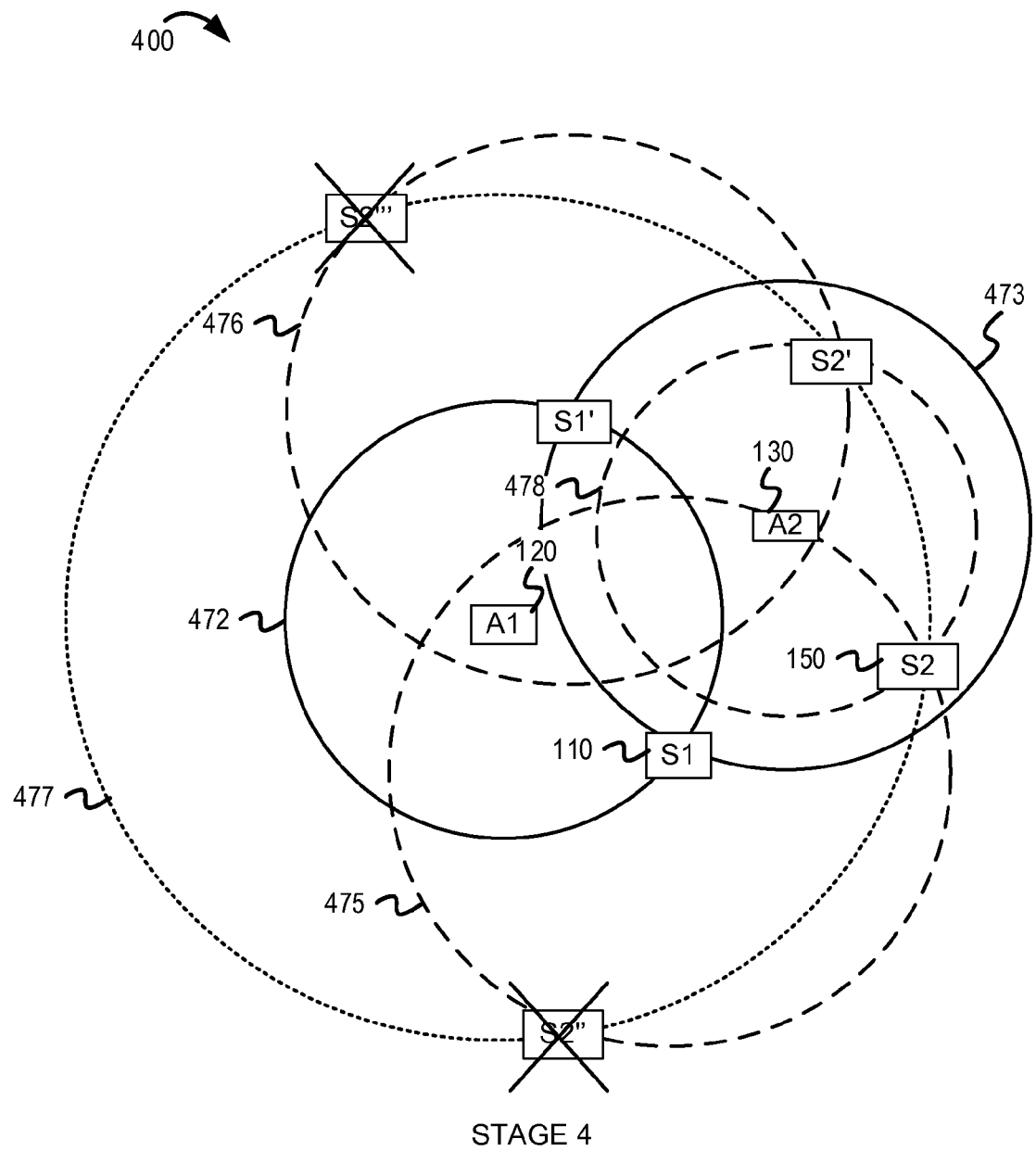

In some implementations, after Stage 3 of FIG. 7 or Stage 4 of FIG. 8, the position calculation unit 115 can determine whether one or more of the possible locations of the observing client station 110 and/or the target client station 150 can be ignored (and therefore reduce ambiguity) based on information stored within the position calculation unit 155 that constraints the location possibilities of the devices (e.g., based on the environment associated with the wireless communication network and/or based on a range of the access points). For example, if the access points 120 and 130 and the observing client station 110 are in a shopping mall, the position calculation unit 115 can ignore one or more of the possible locations S1, S1', S2 or S2' of the devices if the location is outside the shopping mall. For example, the position calculation unit 115 can superimpose a map of the shopping mall on the diagram shown in FIG. 7 or FIG. 8 and determine that one of the possible locations of the devices is outside the shopping mall.

It should be understood that the depicted diagrams (FIGS. 1-9) are examples meant to aid in understanding embodiments and should not be used to limit embodiments or limit scope of the claims. Embodiments may perform additional operations, fewer operations, operations in a different order, operations in parallel, and some operations differently. For example, although Stage C of FIG. 1 describes the observing client station 110 detecting a message transmitted from the target client station 150 to the access point 120 and subsequently detecting an acknowledgement message transmitted from the access point 120 to the target client station 150 in order to determine the timing information described in Stage D of FIG. 1 and blocks 216-220 of FIG. 3, embodiments are not so limited. In some embodiments, the observing client station 110 can determine the timing information (which is used to determine distance D1 from the target client station 150 to the access point 120) in response to detecting a message transmitted from the access point 120 to the target client station 150 and subsequently detecting an acknowledgement message transmitted from the client station 150 to the access point 120. In other words, the exchange of messages detected between the access point 120 and the target client station 150 can originate from either of the devices.

It is further noted that, although FIG. 1 shows client stations as the observing client station 110 and the target client station 150, embodiments are not so limited. In some embodiments, the observing communication device and/or the target communication device may be network devices that can operation as both a client station and an access point (e.g., the network device may include access point capabilities or SoftAP capabilities), or may be other types of communication devices (e.g., WLAN devices). Also, in some embodiments, the observing communication device may be a stand-alone access point, a network server, or other type of network device. Furthermore, although FIG. 1 shows an access point 120, in some embodiments other suitable network coordinating device capable of managing communications associated with client stations in a wireless communication network (e.g., a group owner in a peer-to-peer network) can be used to perform the operations described above with reference to FIGS. 1-8.

Furthermore, although in some implementations $t_{WAIT}$ in the equations Eq. 1 and Eq. 4a-Eq. 4d is equal to the SIFS time interval (or the RIFS time interval that is applied in some cases by 802.11n devices), embodiments are not so limited. In some implementations, $t_{WAIT}$ in the equations Eq. 1 and Eq. 4a-Eq. 4d shown above may also include known (or estimated) internal propagation times within the hardware of the transmitting and/or receiving network device. For example, $t_{WAIT}$ may include the internal propagation times between the antenna and the processing units of the receiving network device.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer (e.g., in the CPU of the communication device), partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
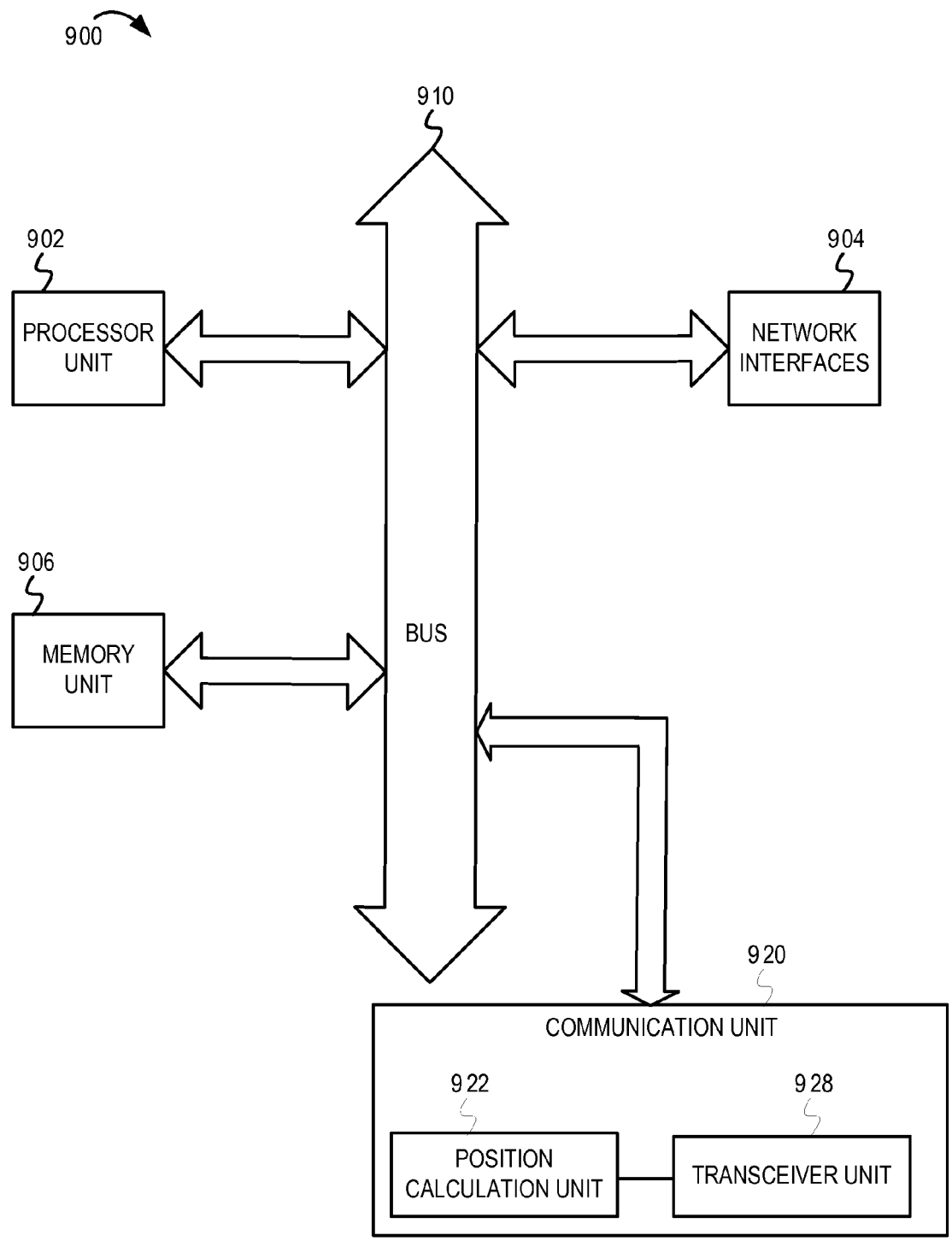
FIG. 9 is a block diagram of an electronic device configured to implement the third party device location estimation mechanism in the wireless communication network.

FIG. 9 is a block diagram of an electronic device 900 configured to implement a third party device location estimation mechanism in a wireless communication network 900. In some implementation, the electronic device 900 may be one of a notebook computer, tablet computer, a netbook, a mobile phone, a gaming console, or other electronic systems comprising wireless communication capabilities. In some implementations, the electronic device 900 may be an access point, a client station with access point capabilities, or other suitable network coordinating device capable of managing communications associated with client stations in a wireless communication network. The electronic device 900 includes a processor unit 902 (possibly including multiple processors, multiple cores, multiple nodes, and/or implementing multithreading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 also includes a bus 910 (e.g., PCI, ISA, PCI-Express, HyperTransport®, InfiniBand®, NuBus, etc.), and network interfaces 904 that include one or more of a wireless network interface (e.g., a WLAN interface, a Bluetooth® interface, a WiMAX interface, a ZigBee® interface, a Wireless USB interface, etc.) and one or more wired network interfaces (e.g., an Ethernet interface).

The electronic device 900 also includes a communication unit 920. In one implementation, the communication unit 920 comprises a position calculation unit 922 and a transceiver unit 928. The communication unit 920 is configured to implement a third party device location estimation mechanism in the wireless communication network 900, e.g., as was described above with reference to FIGS. 1-8. Any one of the above-described functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., additional network interfaces, peripheral devices, etc.). The processor unit 902 and the network interfaces 904 are coupled to the bus 910. Although illustrated as being coupled to the bus 910, the memory 906 may be coupled to the processor unit 902.

While the embodiments are described with reference to various implementations and exploitations, it will be understood that these embodiments are illustrative and that the scope of the inventive subject matter is not limited to them. In general, the third party device location estimation mechanism for wireless communication systems as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining a distance between an observing communication device and a reference communication device of a wireless local area network (WLAN);
   determining a distance between the observing communication device and a target communication device of the WLAN;
   detecting, at the observing communication device, an exchange of messages between the target communication device and the reference communication device;
   determining, at the observing communication device, timing information associated with the messages exchanged between the target communication device and the reference communication device; and
   determining, at the observing communication device, a distance between the target communication device and the reference communication device based, at least in part, on the distance between the observing communication device and the reference communication device, the distance between the observing communication device and the target communication device, and the timing information associated with the messages exchanged between the target communication device and the reference communication device.

2. The method of claim 1, wherein said detecting, at the observing communication device, the exchange of messages between the target communication device and the reference communication device comprises detecting, at the observing communication device, a message transmitted from the target communication device to the reference communication device and a corresponding acknowledgement message transmitted from the reference communication device to the target communication device.

3. The method of claim 2, wherein said determining, at the observing communication device, timing information associated with the messages exchanged between the target communication device and the reference communication device comprises:
   determining a time instant at which the message transmitted from the target communication device to the reference communication device is detected at the observing communication device; and
   determining a time instant at which the acknowledgement message transmitted from the reference communication device to the target communication device is detected at the observing communication device.

4. The method of claim 2, wherein said determining, at the observing communication device, the distance between the target communication device and the reference communication device based, at least in part, on the distance between the observing communication device and the reference communication device, the distance between the observing communication device and the target communication device, and the timing information associated with the messages exchanged between the target communication device and the reference communication device comprises:
   determining, at the observing communication device, a distance between the target communication device and the reference communication device based, at least in part, on the distance between the observing communication device and the reference communication device, the distance between the observing communication device and the target communication device, a time instant at which the message transmitted from the target communication device to the reference communication device is detected at the observing communication device, and a time instant at which the acknowledgement message transmitted from the reference communication device to the target communication device is detected at the observing communication device.

5. The method of claim 1, further comprising:
   determining a location of the observing communication device;
   determining a location of the reference communication device; and estimating a location of the target communication device based, at least in part, on the location of the observing communication device, the location of the reference communication device, the distance between the observing communication device and the target communication device, and the distance between the target communication device and the reference communication device.

6. The method of claim 5, wherein said estimating the location of the target communication device further comprises disambiguating an estimate of the location of the target communication device based, at least in part, on a map of an environment associated with the WLAN or based, at least in part, on a communication range associated with the reference communication device.

7. The method of claim 1, further comprising:
   determining a location of the reference communication device;
   determining a location of a second reference communication device;
   determining the distance between the observing communication device and the reference communication device;
   determining a distance between the observing communication device and the second reference communication device;
   determining the distance between the observing communication device and the target communication device;
   determining the distance between the target communication device and the reference communication device;
   determining a distance between the target communication device and the second reference communication device; and
   estimating a location of the observing communication device and a location of the target communication device based, at least in part, on the location of the reference communication device, the location of the second reference communication device, the distance between the observing communication device and the reference communication device, the distance between the observing communication device and the second reference communication device, the distance between the observing communication device and the target communication device, the distance between the target communication device and the reference communication device, and the distance between the target communication device and the second reference communication device.

8. The method of claim 1, wherein said determining the distance between the observing communication device and the reference communication device comprises:
- transmitting a message from the observing communication device to the reference communication device;
- determining a time instant at which the message is transmitted from the observing communication device to the reference communication device;
- receiving, at the observing communication device, an acknowledgement message from the reference communication device;
- determining a time instant at which the acknowledgement message is received at the observing communication device from the reference communication device;
- determining a time difference between the time instant at which the message is transmitted from the observing communication device to the reference communication device and the time instant at which the acknowledgement message is received at the observing communication device from the reference communication device; and
- determining the distance between the observing communication device and the reference communication device based, at least in part, on the determined time difference.

9. The method of claim 1, wherein said determining the distance between the observing communication device and the target communication device comprises:
- transmitting a message from the observing communication device to the target communication device;
- determining a time instant at which the message is transmitted from the observing communication device to the target communication device;
- receiving, at the observing communication device, an acknowledgement message from the target communication device;
- determining a time instant at which the acknowledgement message is received at the observing communication device from the target communication device;
- determining a time difference between the time instant at which the message is transmitted from the observing communication device to the target communication device and the time instant at which the acknowledgement message is received at the observing communication device from the target communication device; and
- determining the distance between the observing communication device and the target communication device based, at least in part, on the determined time difference.

10. A wireless communication device comprising:
a processing unit;
a network interface coupled to the processing unit; and
a position calculation unit operable to:
- determine a distance between the wireless communication device and a reference communication device of a wireless local area network (WLAN);
- determine a distance between the wireless communication device and a target wireless communication device of the WLAN;
- detect an exchange of messages between the target wireless communication device and the reference communication device;
- determine timing information associated with the messages exchanged between the target wireless communication device and the reference communication device; and
- determine a distance between the target wireless communication device and the reference communication device based, at least in part, on the distance between the wireless communication device and the reference communication device, the distance between the wireless communication device and the target wireless communication device, and the timing information associated with the messages exchanged between the target wireless communication device and the reference communication device.

11. The wireless communication device of claim 10, wherein the position calculation unit operable to detect the exchange of messages between the target wireless communication device and the reference communication device comprises the position calculation unit operable to detect a message transmitted from the target wireless communication device to the reference communication device and a corresponding acknowledgement message transmitted from the reference communication device to the target wireless communication device.

12. The wireless communication device of claim 11, wherein the position calculation unit operable to determine timing information associated with the messages exchanged between the target wireless communication device and the reference communication device comprises the position calculation unit operable to:
- determine a time instant at which the message transmitted from the target wireless communication device to the reference communication device is detected at the wireless communication device; and
- determine a time instant at which the acknowledgement message transmitted from the reference communication device to the target wireless communication device is detected at the wireless communication device.

13. The wireless communication device of claim 11, wherein the position calculation unit operable to determine the distance between the target wireless communication device and the reference communication device based, at least in part, on the distance between the wireless communication device and the reference communication device, the distance between the wireless communication device and the target wireless communication device, and the timing information associated with the messages exchanged between the target wireless communication device and the reference communication device comprises the position calculation unit operable to:
- determine a distance between the target wireless communication device and the reference communication device based, at least in part, on the distance between the wireless communication device and the reference communication device, the distance between the wireless communication device and the target wireless communication device, a time instant at which the message transmitted from the target wireless communication device to the reference communication device is detected at the wireless communication device, and a time instant at which the acknowledgement message transmitted from the reference communication device to the target wireless communication device is detected at the wireless communication device.

14. The wireless communication device of claim 10, wherein the position calculation unit is further operable to:
- determine a location of the wireless communication device; determine a location of the reference communication device; and
- estimate a location of the target wireless communication device based, at least in part, on the location of the wireless communication device, the location of the reference communication device, the distance between the wireless communication device and the target wireless communication device, and the distance between the target wireless communication device and the reference communication device.

15. The wireless communication device of claim 10, wherein the position calculation unit is further operable to:
determine a location of the reference communication device;
determine a location of a second reference communication device;
determine the distance between the wireless communication device and the reference communication device;
determining a distance between the wireless communication device and the second reference communication device;
determining the distance between the wireless communication device and the target wireless communication device;
determining the distance between the target wireless communication device and the reference communication device;
determining a distance between the target wireless communication device and the second reference communication device; and
estimating a location of the wireless communication device and a location of the target wireless communication device based, at least in part, on the location of the reference communication device, the location of the second reference communication device, the distance between the wireless communication device and the reference communication device, the distance between the wireless communication device and the second reference communication device, the distance between the wireless communication device and the target wireless communication device, the distance between the target wireless communication device and the reference communication device, and the distance between the target wireless communication device and the second reference communication device.

16. One or more non-transitory machine-readable storage media, having instructions stored therein, which, when executed by one or more processors causes the one or more processors to perform operations that comprise:
determining a distance between an observing communication device and a reference communication device of a wireless local area network (WLAN);
determining a distance between the observing communication device and a target communication device of the WLAN;
detecting, at the observing communication device, an exchange of messages between the target communication device and the reference communication device;
determining, at the observing communication device, timing information associated with the messages exchanged between the target communication device and the reference communication device; and
determining, at the observing communication device, a distance between the target communication device and the reference communication device based, at least in part, on the distance between the observing communication device and the reference communication device, the distance between the observing communication device and the target communication device, and the timing information associated with the messages exchanged between the target communication device and the reference communication device.

17. The non-transitory machine-readable storage media of claim 16, wherein said operation of detecting, at the observing communication device, the exchange of messages between the target communication device and the reference communication device comprises detecting, at the observing communication device, a message transmitted from the target communication device to the reference communication device and a corresponding acknowledgement message transmitted from the reference communication device to the target communication device.

18. The non-transitory machine-readable storage media of claim 17, wherein said operation of determining, at the observing communication device, timing information associated with the messages exchanged between the target communication device and the reference communication device comprises: determining a time instant at which the message transmitted from the target communication device to the reference communication device is detected at the observing communication device; and
determining a time instant at which the acknowledgement message transmitted from the reference communication device to the target communication device is detected at the observing communication device.

19. The non-transitory machine-readable storage media of claim 17, wherein said operation of determining, at the observing communication device, the distance between the target communication device and the reference communication device based, at least in part, on the distance between the observing communication device and the reference communication device, the distance between the observing communication device and the target communication device, and the timing information associated with the messages exchanged between the target communication device and the reference communication device comprises: determining, at the observing communication device, a distance between the target communication device and the reference communication device based, at least in part, on the distance between the observing communication device and the reference communication device, the distance between the observing communication device and the target communication device, a time instant at which the message transmitted from the target communication device to the reference communication device is detected at the observing communication device, and a time instant at which the acknowledgement message transmitted from the reference communication device to the target communication device is detected at the observing communication device.

20. The non-transitory machine-readable storage media of claim 16, wherein the operations further comprise: determining a location of the observing communication device; determining a location of the reference communication device; and estimating a location of the target communication device based, at least in part, on the location of the observing communication device, the location of the reference communication device, the distance between the observing communication device
and the target communication device, and the distance between the target communication device and the reference communication device.

21. The non-transitory machine-readable storage media of claim 16, wherein the operations further comprise: determining a location of the reference communication device; determining a location of a second reference communication device; determining the distance between the observing communication device and the reference communication device; determining a distance between the observing communication device and the second reference communication device; determining the distance between the observing communication device and the target communication device; determining the distance between the target communication device and the reference communication device; determining a distance between the target communication device and the second reference communication device; and estimating a location of the observing communication device and a location of the target communication device based, at least in part, on the location of the reference communication device, the location of the second reference communication device, the distance between the observing communication device and the reference communication device, the distance between the observing communication device and the second reference communication device, the distance between the observing communication device and the target communication device, the distance between the target communication device and the reference communication device, and the distance between the target communication device and the second reference communication device.

22. A method comprising:
  observing, at an observing communication device of a wireless local area network (WLAN), an exchange of messages between a target communication device of the WLAN and a reference communication device of the WLAN; and
  determining, at the observing communication device, a distance between the target communication device and the reference communication device based at least in part upon
  a determined distance between the observing communication device and the target communication device,
  a determined distance between the observing communication device and the reference communication device, and
  timing information associated with the observed messages exchanged between the target communication device and the reference communication device.

23. The method of claim 22, further comprising:
  determining a first round trip time between transmitting a first message from the observing communication device to the target communication device and receiving a response message from the target communication device;
  determining, at the observing communication device, the determined distance between the observing communication device and the target communication device based upon the first round trip time;
  determining a second round trip time between transmitting a second message from the observing communication device to the reference communication device and receiving a response message from the reference communication device; and
  determining, at the observing communication device, the determined distance between the observing communication device and the reference communication device based upon the second round trip time.

24. The method of claim 22, further comprising:
  determining, at the observing communication device, timing information associated with the messages exchanged between the target communication device and the reference communication device.

25. The method of claim 22, wherein the messages observed at the observing communication device comprises a first message transmitted from the reference communication device to the target communication device and a corresponding acknowledgement message transmitted from the target communication device to the reference communication device.

26. The method of claim 25, wherein the timing information associated with messages observed at the observing communication device includes:
  a time instant at which the first message transmitted from the reference communication device to the target communication device is observed at the observing communication device, and
  a time instant at which the corresponding acknowledgement message transmitted from the target communication device to the reference communication device is observed at the observing communication device.

* * * * *